3,359,102
OPTICAL BRIGHTENING OF PHOTOGRAPHIC
MATERIALS
Hendrik Adolf Pattijn, Wilrijk-Antwerp, Edwin Frans
Hendricx, Boechout, Jozef Frans Willems, Wilrijk-Antwerp, and August Jean Van Paesschen, Hove, Belgium,
assignors to Gevaert Photo-Producten N.V., Mortsel-Antwerp, Belgium, a Belgian company
No Drawing. Filed Apr. 6, 1964, Ser. No. 357,752
Claims priority, application Netherlands, Apr. 5, 1963, 291,196
20 Claims. (Cl. 96—1.8)

This invention pertains to a process for optically brightening photographic compositions and more particularly to the optical brightening of photographic materials by means of a combination of a dispersed polymer and fluoroescent substances.

The addition of certain fluoroescent coumarin compounds as optical brightening agent to hydrophobic textile fibres, cotton and photographic paper, is known from the United States patent specification 2,702,296.

There has been found now an improved process for optically brightening photographic materials by means of coumarin derivatives by performing this brightening by incorporating into said materials a latex polymer and a basic coumarin derivative in contact with each other. This improved process is based on the establishment that the optical brightening action of the basic coumarin derivative is markedly enhanced by the presence of a latex polymer. This enhancement of activity is observed for low as well as for high concentrations of basic coumarin derivatives in the presence of a latex polymer.

In the process for optically brightening according to the present invention is used preferably a combination of a synthetic latex and basic coumarin derivatives having the following general formula:

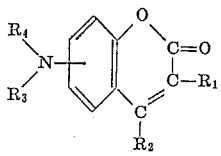

wherein:

$R_1$ represents hydrogen or an alkyl radical, $R_2$ represents hydrogen, an alkyl radical, a substituted alkyl radical, an aryl radical or a substituted aryl radical, each of $R_3$ and $R_4$ (same or different) represents hydrogen, an alkyl radical or a substituted alkyl radical.

Even more preferred is the use of a combination of a synthetic latex and basic coumarin derivatives according to the following general formula:

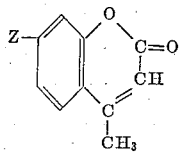

wherein:

Z represents an akylamino grouping, or an hydroxyalkylamino grouping such as methylamino, ethylamino, propylamino, butylamino, ethanolamino, dimethylamino, diethylamino, diethanolamino, an arylamino grouping such as phenylamino, diphenylamino, m-chlorophenylamino, p-ethoxyphenylamino, p-methoxyphenylamino, cycloalkylamino such as cyclohexylamino and N-morpholinyl.

In combination with the above-mentioned basic coumarin derivatives is preferably utilized a dispersion stable in water or in aqueous medium of a molecular compound obtained by radical polymerization (in emulsion) of one or more polymerizable monomers by means of a dispersing agent such as described i.a. in Preparative Methods of Polymer Chemistry by W. Sorenson and T. W. Campbell, Interscience Publishers, New York (1961).

Polymer dispersions suited for being applied in the present invention are obtained i.a. by radical polymerization in emulsion of monomers which can be classified under a formula having the following structure:

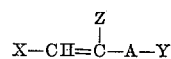

wherein:

A represents a single bond or a methylene grouping,

X represents hydrogen, an alkyl grouping such as methyl, a carboxyl grouping, an alkylcarboxy grouping or a carbamoyl grouping, Y represents hydrogen, a halogen atom, methyl, an alkylcarboxy grouping, a carbalkoxy grouping, a heterocyclic radical such as pyridyl, an aromatic radical such as phenyl, a carboxyl grouping, a sulfo grouping, an alkoxy grouping, an alkylcarbonyl grouping, an alkylsulfonyl grouping, a cyano grouping or a vinyl grouping, and Z represents hydrogen, a halogen atom, an alkyl grouping such as methyl, a carboxymethylene grouping, a carboxymethylene ester grouping or a cyano grouping.

This radical polymerization occurs in aqueous medium in the presence of a dispersing agent such as described i.a. in K. Laux: "Die grenzflächenaktiven Stoffe" in the publication of Winnacker-Küchler "Chemische Technologie," Carl Hanser-Verlag, Munich (1960), p. 155–242.

Good results are attained with emulsion polymers, which in aqueous medium are dispersed with non-ionic, anionic as well as with cationic dispersing agents. An enhanced fluorescence was observed when admixing coumarin with, for instance, an emulsion-polymerized polystyrene dispersed with the aid of an anionic dispersing agent, an emulsion-polymerized polyethyl acrylate dispersed with the aid of a non-ionic dispersing agent, as well as with an emulsion-polymerized copoly(n-butyl acrylate/acrylonitrile) (60/40% by weight) dispersed with the aid of a cationic dispersing agent. Suitable dispersing agents and emulsion polymers for being applied in the present invention are described in our United States patent application Ser. No. 339,877.

Particularly good results are attained with a latex of an emulsion-polymerized polyethyl acrylate, a latex of an emulsion-polymerized copoly(vinyl chloride/ethyl acrylate) (57.3/42.7% by weight) and a latex of an emulsion - polymerized copoly(acrylonitrile/butadiene) (33/67% by weight).

Polymers obtained according to other known polymerization techniques can also be finely dispersed in water occasionally with the aid of protective colloids such as polyvinyl alcohol, carboxymethyl cellulose, hydroxyethyl cellulose and the like and the latices thus prepared are also suited for being applied in a process according to the present invention. Polymers used for preparing such dispersions are e.g. polyethylene, polyisobutene, polyvinyl acetals such as polyvinyl formal, polyvinyl acetal and polyvinyl butyral. Occasionally these polymers may comprise a plasticizer. The best results, however, are attained when using latices prepared by emulsion polymerization.

The types of polymer dispersions given above are examples of a "synthetic latex" by which is to be understood any stable polymer hydrosol, since in principle any stable polymer hydrosol is suitable for being used in the brightening process of the present invention.

The molecular weight of the polymers used according to the present invention is not critical as to the effect of the enhancement of the optical brightening since the polymer is not present in dissolved state, but as dispersed solid particles. The particle size is the size usual for latices.

A mixture of a latex polymer with a basic coumarin derivative according to the afore-mentioned general formulas displays a markedly higher fluorescence than an aqueous solution of only this coumarin derivative in an identical concentration or than a mixture of hydrophilic colloids such as gelatin with this basic coumarin derivative in an identical concentration.

According to the present invention the latex polymer and the fluorescent coumarin derivatives according to the afore-mentioned general formulas are preferably used for optically brightening photographic material since these optical brighteners are suited, without affecting the photographic properties, for being incorporated into light-sensitive silver halide emulsion layers and/or other layers of a photographic material. Preferably the coumarin derivative and latex polymer are added to the same layer of a photographic material. In this case the latex polymer and the basic coumarin derivative or derivatives may be added together or successively. The basic coumarin derivative and the latex polymer may also be incorporated into different layers of a photographic material, said layers necessarily being in water-permeable relationship, so that the coumarin derivative is able to come into contact with the dispersed latex polymer by diffusion.

When the latex polymer and the basic coumarin derivatives are added simultaneously to a composition of a layer of a photographic material, the basic coumarin derivative is preferably added beforehand in the form of a 10% solution in methanol or as a 0.5% solution in ethanol/water (50/50) to the latex, in such a proportion, however, that the latex polymer will not flocculate by the action of the solvent of the basic coumarin derivative.

The combination of latex polymer and afore-mentioned fluorescent coumarin derivative is added preferably to a light-sensitive silver halide emulsion prepared with gelatin as binding agent without excluding, however, the incorporation in light-sensitive layers which contain other hydrophilic binders such as polyvinyl alcohol and its derivatives, collodion or other natural or synthetic binders as described e.g. in the United States patent specification 3,000,741. The afore-mentioned combination may further be added to the composition of non-light-sensitive photographic layers which contain hydrophilic colloids such as gelatin, polyvinyl alcohol, carboxymethylcellulose, alginates, polyvinyl pyrrolidone, and polyvinyl oxazolidone. As non-light-sensitive photographic layers may be mentioned i.a. protective layers, backing layers, antihalation layers, filter layers, subbing layers and baryta layers. Further may be mentioned layers of materials either light-sensitive or not, suited for preparing images according to the silver complex diffusion transfer process, such as image-receiving layers comprising development nuclei for the complexed silver halide.

The combination of latex polymer and coumarin derivative is suited for optically brightening photographic black-and-white material as well as for improving the brightness of the white areas of photographic color images.

The optical brightening mixture of the basic coumarin derivatives and the latices does not impair the light-sensitivity of the emulsion layers. When incorporated into photographic material together with color couplers, developing agents, surface-active compounds, sensitizing agents, fog-inhibiting agents, stabilising agents, hardening agents, and plasticizers, they are not found to adversely affect the photographic properties.

According to the function of the layer in the photographic material the binding agent may consist entirely or partially of the latex polymer as described above. The latex polymer may constitute up to 60% of the total binding agent in the photographic silver halide emulsion material.

The amount of latex polymer (stable polymer hydrosol), which is added to a light-sensitive silver halide emulsion layer substantially containing gelatin as binding agent is preferably from 10 to 35% by weight of the total amount of binding agent. The amount of gelatin in a conventional paper emulsion is approximately 10 g. per sq. m. The gelatin silver halide emulsions are usually hardened in a known way. For more particulars about the hardening of a photographic coating and about hardening agents, we refer to P. Glafkidès, Photographic Chemistry, vol. 1, p. 382–383, Fountain Press, London.

The amount of latex polymer added to a baryta layer containing gelatin is preferably from 10 to 75% by weight of the gelatin.

In the photographic material the basic coumarin derivative is preferably used in an amount of 0.25 to 5% by weight of the latex polymer.

In the silver halide emulsion containing gelatin, the amount by weight of basic coumarin derivative is preferably from 1.5 to 4% by weight of the amount of latex polymer. In light-sensitive silver halide emulsions a mixture of 0.075 g. of a basic coumarin derivative with 4 g. of latex polymer is preferably used per sq. m.

A fine optical brightening is attained in light-sensitive as well as in non-light-sensitive layers such as e.g. baryta layers of a photographic material to be viewed in reflection, with amounts of basic coumarin derivative from 0.025 to 0.1 g. per sq. m. Even larger amounts of basic coumarin derivative e.g. up to 1 g. per sq. m. may be used if an exceptionally high brightness is required.

The method of optically brightening according to the present invention can be applied to all kinds of photographic material that is to be viewed by reflection such as photographic positive paper for black-and-white and color photography, for amateur and professional as well as graphic purposes, and transfer paper such as non-light-sensitive transfer paper used in the silver complex diffusion transfer process.

The combination of latex polymer and basic coumarin derivative may also be successfully utilized for optically brightening photographic materials other than the classical silver halide materials. For example, the combination may be used in photographic materials which are not wet processed such as print-out emulsions. The combination may further be applied to the preparation of photographic materials which are not based on the use of light-sensitive silver salts, e.g. electrophotographic materials. A mixture of basic coumarin derivative and latex polymer may e.g. be added to the composition of a conductive paper support, a conductive intermediate layer or to the photoconductive layer itself. When optically brightening a photoconductive zinc oxide layer with a mixture of latex polymer and coumarin derivative, the latex polymer is at the same time acting as a binding agent for the zinc oxide.

The following examples illustrate the invention.

EXAMPLE 1

On a strip A of a baryta-coated photographic paper is coated a gelatin silver bromoiodide paper emulsion containing per kg. 100 g. of gelatin.

On a strip B of an identical baryta-coated photographic paper is coated a same gelatin silver bromoiodide paper emulsion to which have been added 100 cc. of a stable 40% latex of copoly(ethylacrylate/vinylisobutyl ether/styrene/acrylic acid) (66/20/12/2% by weight) per kg. of emulsion.

On a strip C of an identical baryta-coated photographic paper is coated a same gelatin silver bromoiodide paper emulsion to which have been added 7.7 cc. of a 10% solution of 7-diethylamine-4-methylcoumarin in methanol per kg. of emulsion.

On a strip D of an identical baryta-coated photographic paper is coated a same gelatin silver bromoiodide paper emulsion to which have been added per kg. 100 cc. of a stable 40% latex of copoly(ethyl acrylate/vinyl isobutyl ether/styrene/acrylic acid) (66/20/12/2% by weight) prepared by emulsion polymerization and 7.5 cc. of a 10% solution of 7 - diethylamine - 4 - methylcoumarin in methanol.

Upon drying, the paper strips A and C contain per sq. m. 4.5 g. of gelatin and 0.014 mole of silver halide. The paper strips B and D contain also 3.5 g. of emulsion-polymerized latex per sq. m.

Upon exposure, these strips are developed for 1½ min. at 20° C. in a developing bath having the following composition:

| | G. |
|---|---|
| p-Monoethyl aminophenol sulfate | 1.5 |
| Sodium sulfite (anhydrous) | 25 |
| Hydroquinone | 6 |
| Sodium carbonate (anhydrous) | 40 |
| Potassium bromide | 1 |
| Water to 1000 cc. | |

Subsequently the strips are washed for 15 sec., fixed for 10 min., and rinsed for 1 hr. in running water at 15° C.

Strip D is much whiter than the other strips and surprisingly whiter than strip C.

EXAMPLE 2

On a paper strip A is coated a 6% aqueous gelatin solution, in such a way that 6 g. of gelatin are present per sq. m.

On a paper strip B is coated a same gelatin solution, to which have been added, however, per liter of gelatin solution 80 cc. of a 50% latex of copoly(vinyl chloride/ethyl acrylate) (57/43) prepared by emulsion polymerization.

On a strip C is coated a gelatin solution the same as that on strip A, but to which have been added per liter of gelatin solution 7.5 cc. of a 10% solution of 7-diethylamine-4-methylcoumarin in methanol.

On a strip D is coated a gelatin solution the same as that on strip A, but to which have been added per liter of gelatin solution 80 cc. of a 50% latex of the same copoly(vinyl chloride/ethyl acrylate) (57/43) and 7.5 cc. of a 10% solution of 7-diethylamine-4-methylcoumarin in methanol.

Strip D is found to be much whiter than the other strips.

EXAMPLE 3

A strip of photographic paper A is covered with a baryta layer by means of the following mixture:

| | Kg. |
|---|---|
| 50% aqueous barium sulfate suspension | 2 |
| 10% aqueous gelatin solution | 1 |

Upon drying this baryta layer manifests a weight of 45 g. per sq. m.

On a strip of photographic paper B of a quality identical to that of A is coated the same baryta composition, to which, however, have been added 100 cc. of a 50% latex of copoly(vinyl chloride/ethyl acrylate) (57/43) prepared by emulsion polymerization.

On a strip of photographic paper C of a quality identical to that of A is coated the baryta composition of strip A, to which composition, however, have been added per kg. 7.5 cc. of a 10% solution of 7-diethylamine-4-methylcoumarin in methanol.

On a strip of photographic paper D of a quality identical to that of A is coated the baryta composition of strip A, to which composition, however, have been added per kg. 100 cc. of a 50% latex of the same copoly(vinyl chloride/ethyl acrylate) (57/43) and 7.5 cc. of a 10% solution of 7-diethylamine-4-methylcoumarin in methanol.

Strip D is found to be much whiter than the strips A, B and C.

By replacing the latex of copoly(vinyl chloride/ethyl acrylate) (57/43) by a latex of an aforementioned polymer obtained by radical polymerization of an emulsified monomer, an enhanced brightening is obtained just as well.

EXAMPLE 4

The strips prepared according to Example 3 are coated with a gelatin silver bromoiodide emulsion in such a way that 0.014 mole of silver halide and 10 g. of gelatin are present per sq. m. After drying and exposing these strips, developing, fixing and rinsing them as described in Example 1, the strip D is found to be much whiter than the strips A, B and C once again.

EXAMPLE 5

An image-receiving material to be used in the silver complex diffusion transfer process is optically brightened by applying to the paper support a stratum having the following composition:

| Gelatin | g. | 2 |
|---|---|---|
| Aqueous non-ionic dispersion of copoly(n-butyl acrylate/vinyl acetate) (50.6/49.4% by weight) with polyvinyl alcohol as protective colloid | cc. | 60 |
| 0.5% solution of 7-diethylamino-4-methylcoumarin in a mixture of ethanol/water (50/50) | cc. | 15 |
| Water | cc. | 138 |

Upon drying, an image-receiving layer having the following composition is coated on this stratum:

| Gelatin | g. | 33 |
|---|---|---|
| Strontium chloride | g. | 10 |
| Sodium thiosulfate (anhydrous) | g. | 40 |
| 10% aqueous solution of sodium sulfide | cc. | 2 |
| 10% aqueous solution of cobalt (II) nitrate | cc. | 10 |
| Water | cc. | 915 |

To this image-receiving layer is applied an aftercoating from the following composition:

| Ammonium alginate | g. | 25 |
|---|---|---|
| 20% aqueous formaldehyde solution | cc. | 10 |
| Water | cc. | 965 |

The image-receiving material thus prepared offers an enhanced contrast due to the bright highlights.

EXAMPLE 6

On a strip of photographic paper A is coated a baryta layer from the following mixture:

| | Kg. |
|---|---|
| 50% aqueous barium sulfate suspension | 2 |
| 10% aqueous gelatin solution | 1 |

Upon drying, the baryta layer weighs 45 g. per sq. m. On this dry baryta layer is coated an aqueous gelatin solution containing 7-diethylamino-4-methylcoumarin such that the resulting layer, upon drying, contains 6 g. of gelatin and 0.075 g. of the coumarin derivative per sq. m.

On a strip of photographic paper B of a quality identical to that of the photographic paper A is coated the same baryta composition to which, however, have been added per kg. 100 cc. of a 50% aqueous dispersion of copoly(vinylchloride/ethyl acrylate) (57/43% by weight). To the dry baryta layer is applied an identical gelatin layer containing the coumarin derivative.

On each of the materials A and B is coated a conventionally formalin-hardened silver chloride paper emulsion layer containing 10 g. of gelatin per sq. m.

Upon exposure and processing as in Example 1, the material B shows an increased whiteness in the highlights.

EXAMPLE 7

On a strip of photographic paper A is coated a baryta layer from the following mixture:

| | |
|---|---|
| 50% aqueous barium sulfate suspension | kg-- 2 |
| 10% aqueous gelatin solution | kg-- 1 |
| 7-dimethylamino-4-methylcoumarin | g-- 4 |

Upon drying, the baryta layer weighs 45 g. per sq. m. To the dry baryta layer is applied a conventionally formalin-hardened silver chloride emulsion containing 10 g. of gelatin per sq. m.

On a strip of photographic paper B is coated a baryta layer from the following mixture:

| | |
|---|---|
| 50% aqueous barium sulfate suspension | kg-- 2 |
| 10% aqueous gelatin solution | g-- 600 |
| 10% latex of an emulsion-polymerized copoly(vinyl chloride/ethyl acrylate) (57.3/42.7% by weight) with lauryl sulfate as dispersing agent | g-- 400 |
| 7-dimethylamino-4-methylcoumarin | g-- 0.1 |

Upon drying, the baryta layer weighs 45 g. per sq. m. On the dry baryta layer is coated a conventionally formalin-hardened silver chloride emulsion containing 10 g. of gelatin per sq. m. After exposure and processing in the same way as in Example 1, the brightness of the white parts of material B is markedly higher than that of material A.

EXAMPLE 8

Example 7 is repeated, the photographic paper B, however, having a content of 7-dimethylamino-4-methylcoumarin increased by 20 times.

EXAMPLE 9

330 g. of photoconductive zinc oxide are dispersed in 1 kg. of a latex containing 55% by weight of a copoly(n-butylacrylate/vinyl acetate) (50.6/49.4% by weight) dispersed with the aid of a non-ionic dispersing agent and polyvinyl alcohol as protective colloid. To this composition is added 1 g. of 7-diethylamino-4-methylcoumarin. This optically brightening composition is coated on a parchment paper base in such a way that 16 g. of photoconductive zinc oxide are present per sq. m.

EXAMPLE 10

Material A

To a common paper support weighing 135 g./sq. m. is applied to gelatin layer in such a way that 6 g. of gelatin are present per sq. m.

Material B

To a same paper support is applied a 50% latex of copoly(vinylchloride/ethyl acrylate) (57/43% by weight) prepared by emulsion polymerization in the presence of an anionic dispersing agent in such a way that the dried layer contains 4 g. of this latex polymer per sq. m.

Material C

To a same paper support is applied a 50% latex of polyethyl acrylate prepared by emulsion polymerization in the presence of non-ionic dispersing agent in such a way that the dried layer contains 4 g. of this latex polymer per sq. m.

Material D

To a same paper support is applied a 50% latex of copoly(n-butyl acrylate/acrylonitrile) (60/40% by weight) prepared by emulsion polymerization in the presence of a cationic dispersing agent, in such a way that the dried layer contains 4 g. of this latex polymer per sq. m.

Material E

To a same paper support is applied a 10% solution in methanol of 7-diethylamino-4-methylcoumarin in such a way that after evaporating the methanol 0.075 g. of this coumarin derivative is present per sq. m.

Material F

To a same paper support is applied a layer containing per sq. m. 4 g. of the latex used in Material B and 0.075 g. of the coumarin derivative used in Material E.

Material G

To a same paper support is applied a layer containing per sq. m. 4 g. of the latex used in Material C and 0.075 g. of the coumarin derivative used in Material E.

Material H

To a same paper support is applied a layer containing per sq. m. 4 g. of the latex polymer used in Material D and 0.075 g. of the coumarin derivative used in Material E.

The reflection of white light of the above-mentioned materials is measured by means of an Elrepho reflectometer (marketed by Carl Zeiss) wherein use is made of a xenon lamp as radiation source provided with a filter only transmitting ultraviolet and blue radiation. In the following table are listed the results of the reflection measurements calculated in values relative to the reflecting power of magnesium oxide powder to which a reference value of 100 is given.

TABLE

| Material: | Relative reflection value |
|---|---|
| A | 88.26 |
| B | 88.76 |
| C | 87.98 |
| D | 87.74 |
| E | 97.55 |
| F | 109.35 |
| G | 108.75 |
| H | 107.54 |

EXAMPLE 11

Material A

To a common paper support weighing 135 g./sq. m. is applied a 50% latex of copoly(vinylchloride/ethyl acrylate) (57/43% by weight) prepared by emulsion polymerization in the presence of an anionic dispersing agent, in such a way that the dried layer contains 4 g. of this latex polymer per sq. m.

Material B

To a same paper support is applied a 10% solution in methanol of 7-diethylamino-4-methylcoumarin in such a way that after evaporation of the methanol 0.075 g. of the coumarin derivative is present per sq. m.

Material C

To a same paper support is applied a gelatin layer in such a way that 6 g. of gelatin are present per sq. m.

Material D

To a same paper support is applied a layer which in dry condition contains per sq. m. 6 g. of gelatin and 4 g. of the latex polymer used in Material A.

Material E

To a same paper support is applied a layer which in dry condition contains 6 g. of gelatin and 0.075 g. of 7-diethylamino-4-methylcoumarin per sq. m.

Material F

To a same paper support is applied a layer which in dry condition contains per sq. m. 6 g. of gelatin, 0.075 g. of 7-diethylamino-4-methylcoumarin, and 4 g. of the latex polymer used in Material A.

Material G

To a same paper support is applied a layer which in dry condition contains per sq. m. 0.075 g. of 7-diethylamino-4-methylcoumarin and 4 g. of the latex polymer used in Material A.

The reflection values are measured as described in Example 11 and listed in the following table.

TABLE

| Material: | Relative reflection value |
|---|---|
| A | 90.74 |
| B | 98.43 |
| C | 87.20 |
| D | 89.05 |
| E | 98.88 |
| F | 110.48 |
| G | 111.22 |

We claim:

1. The method of enhancing the brightness of photographic material including at least one layer of a coating having a polymer latex uniformly incorporated therein, said method being characterized by the step of incorporating in said material a basic coumarin derivative in effective contact with said first-mentioned layer, said basic coumarin derivative being of the general formula:

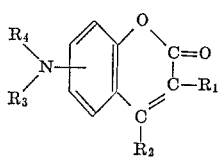

wherein:

$R_1$ represents hydrogen or an alkyl radical $R_2$ represents hydrogen, an alkyl radical, and an aryl radical, each of $R_3$ and $R_4$ represents hydrogen and an alkyl radical.

2. The method of enhancing the brightness of a photographic material according to claim 1, wherein said coating comprises a mixture of a basic coumarin derivative and a polymer latex in a proportion of 0.25 to 5% by weight of basic coumarin derivative calculated on the amount of polymer latex.

3. The method of enhancing the brightness of a photographic light-sensitive material comprising a support, a layer of a gelatin-containing baryta-coating and a gelatin silver halide emulsion layer, wherein at least one of said layers is said layer of claim 1 containing said polymer latex.

4. The method of enhancing the brightness of a photographic light-sensitive material according to claim 1, wherein said layer is a gelatin silver halide emulsion layer containing 1.5 to 4% by weight of basic coumarin derivative calculated on the amount of dispersed polymer latex and 10 to 35% by weight of polymer latex calculated on the amount of gelatin.

5. The method of enhancing the brightness of a photographic light-sensitive material according to claim 1, wherein said layer is a gelatin-containing baryta coating comprising 0.25 to 5% by weight of a basic coumarin derivative calculated on the amount of the polymer latex incorporated therein and 10 to 75% by weight of polymer latex calculated on the amount of gelatin.

6. The method of enhancing the brightness of a photographic light-sensitive material according to claim 1, wherein said layer is a gelatin silver halide emulsion layer containing 0.075 g. of a basic coumarin derivative and 4 g. of a polymer latex per sq. m.

7. The method of enhancing the brightness of a photographic light-sensitive material according to claim 1, wherein said layer is a gelatin-containing baryta-coating containing 0.025 to 0.1 g. per sq. m. of a basic coumarin derivative and from 1 g. to 2.5 g. per sq. m. of a polymer latex.

8. The method of enhancing the brightness of an electrophotographic material comprising the step of incorporating in said material a mixture of a basic coumarin derivative and a polymer latex, said basic coumarin derivative being of the general formula:

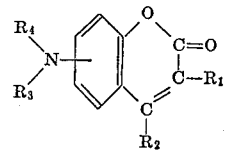

wherein:

$R_1$ represents hydrogen or an alkyl radical, $R_2$ represents hydrogen, an alkyl radical, and an aryl radical, each of $R_3$ and $R_4$ represents hydrogen and an alkyl radical.

9. The method of enhancing the brightness of an electrophotographic material as in claim 8, wherein said material contains photoconductive zinc oxide in addition to said mixture of a basic coumarin derivative and a polymer latex, said derivative and polymer being present in a ratio of 0.25 to 5% by weight of basic coumarin derivative calculated on the amount of polymer latex.

10. The method of enhancing the brightness of a photographic light-sensitive material according to claim 6, wherein the basic coumarin derivative is 7-dethylamino-4-methylcoumarin.

11. The method of enhancing the brightness of an electrophotographic material as in claim 8, wherein said material includes a photoconductive layer comprising photoconductive zinc oxide and said mixture of a basic coumarin derivative and a polymer latex.

12. The method of enhancing the brightness of an electrophotographic material according to claim 11, wherein the basic coumarin derivative is 7-diethylamino-4-methylcoumarin and said latex polymer is dispersed with a non-ionic dispersing agent.

13. A photographic material comprising a mixture of a basic coumarin derivative and a polymer latex, said basis coumarin derivative being of the general formula:

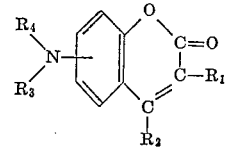

wherein:

$R_1$ represents hydrogen or an alkyl radical, $R_2$ represents hydrogen, an alkyl radical, and an aryl radical, each of $R_3$ and $R_4$ represents hydrogen and an alkyl radical.

14. A photographic material as in claim 13, wherein said material includes a layer comprising said mixture of a latex polymer and a basic coumarin derivative.

15. A photographc material as in claim 14, wherein said mixture of a latex polymer and a basic coumarin derivative is present in a water-permeable colloid layer.

16. A photographic material as in claim 14, wherein said mixture of a polymer latex and a basic coumarin derivative is present in a gelatin-containing silver halide emulsion layer.

17. A photographic material as in claim 14, wherein said mixture of a polymer latex and a basic coumarin derivative is present in a gelatin-containing baryta coating.

18. An electrophotographic material comprising a mixture of a polymer latex and a basic coumarin derivative in a photoconductive layer containing photoconductive zinc oxide, said basic coumarin derivative being of the general formula:

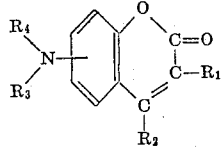

wherein:

$R_1$ represents hydrogen or an alkyl radical, $R_2$ represents hydrogen, an alkyl radical, and an aryl radical each of $R_3$ and $R_4$ represents hydrogen and an alkyl radical.

19. A photographic material containing a mixture of a basic coumarin derivative and a polymer latex in a proportion of 0.25 to 5% by weight of the basic coumarin derivative calculated on the amount of the polymer latex said basic or derivative being of the general formula:

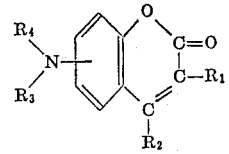

wherein:

$R_1$ represents hydrogen or an alkyl radical, $R_2$ represents hydrogen, an alkyl radical, and an aryl radical, each of $R_3$ and $R_4$ represents hydrogen and an alkyl radical.

20. A photographic material containing a light-sensitive gelatin-containing silver halide emulsion layer which contains 0.075 g. of 7-diethylamino-4-methylcoumarin and 4 g. of polymer latex per sq. m.

References Cited

UNITED STATES PATENTS 2,649,375  8/1953  Davis _____ 96—82
3,211,552  10/1965  Chu et al. _____ 96—114

FOREIGN PATENTS 153,526  10/1953  Australia.

NORMAN G. TORCHIN, *Primary Examiner.*